United States Patent [19]

Hasegawa

[11] 4,123,766
[45] Oct. 31, 1978

[54] ELECTRICALLY CONTROLLED PHOTOGRAPHIC SHUTTER

[75] Inventor: Goro Hasegawa, Fuchu, Japan

[73] Assignee: Canon, Inc., Tokyo, Japan

[21] Appl. No.: 701,990

[22] Filed: Jul. 2, 1976

Related U.S. Application Data

[63] Continuation of Ser. No. 443,721, Feb. 19, 1974, abandoned, which is a continuation of Ser. No. 287,018, Sep. 7, 1972, abandoned, which is a continuation-in-part of Ser. No. 886,957, Dec. 22, 1969, abandoned.

[30] Foreign Application Priority Data

| Dec. 28, 1968 | [JP] | Japan | 43-96019 |
| Dec. 5, 1969 | [JP] | Japan | 44-97707 |
| Dec. 18, 1969 | [JP] | Japan | 44-102147 |

[51] Int. Cl.² .................................. G03B 7/08
[52] U.S. Cl. .................... 354/51; 354/60 R; 354/243; 354/256; 354/258; 354/234

[58] Field of Search .............. 354/246, 259, 48, 50, 354/51, 60, 245, 256, 258, 243, 234

[56] References Cited

U.S. PATENT DOCUMENTS

| 3,082,673 | 3/1963 | Takahama | 354/246 |
| 3,264,965 | 8/1966 | Rentschler | 354/259 |
| 3,434,403 | 3/1969 | Biedermann | 354/51 |
| 3,479,935 | 11/1969 | Harvey | 354/50 |

*Primary Examiner*—Monroe H. Hayes
*Attorney, Agent, or Firm*—Toren, McGeady and Stanger

[57] ABSTRACT

In the disclosed shutter system, a standby mechanical shutter control operates a shutter in response to failure of the power source of a primary electrical shutter control. Normally the power source enables the electrical shutter control to time and operate the shutter. More specifically, in the disclosure, a standby mechanical timer responds to the failure of a power source to actuate a magnet in an electrical automatic timing arrangement, and operates the shutter for a fixed period.

20 Claims, 8 Drawing Figures

INVENTOR
GORO HASEGAWA

INVENTOR
GORO HASEGAWA

ELECTRICALLY CONTROLLED PHOTOGRAPHIC SHUTTER

REFERENCE TO COPENDING APPLICATIONS

This is a continuation of application Ser. No. 443,721 which was filed Feb. 19, 1974 now abandoned which, in turn is a continuation of application Ser. No. 287,018 filed Sept. 7, 1972 now abandoned, which in turn is a continuation-in-part of Ser. No. 886,957 filed on Dec. 22, 1969 now abandoned.

BACKGROUND OF THE INVENTION

This invention relates to cameras, and particularly to electrically controlled shutters.

In a conventional electrically controlled shutter, an exposure is produced by pushing down a shutter release button. This actuates a shutter opening mechanism and opens the shutter. After a predetermined time, an electromagnet actuates a shutter closing mechanism which closes the shutter. The predetermined time is established by duration controlling means such as an RC circuit.

Such shutters normally operate well. However, if the operator forgets to load a battery capable of energizing the electromagnet into the camera, or when the battery has run down, or when the battery is insufficient to operate the electromagnet, the shutter closing mechanism will not function properly.

This misfunctioning occurs in either of two types of electrically controlled shutters. In one type, the shutter release button is pushed down to actuate the shutter opening mechanism and the shutter begins to open. The electromagnet is then energized for an operating time determined by means such as an RC circuit, to keep the shutter closing mechanism inoperative. After the operating time has elapsed, the electric current stops flowing through the electromagnet. This actuates the shutter closing mechanism and the shutter is closed. If the battery in this type of shutter is defective, the electromagnet fails to hold back the shutter closing mechanism and the latter operates immediately after the shutter opening mechanism.

In the other type of electrically controlled shutter the release button again actuates the shutter opening mechanism. This opens the shutter. After a measured duration of time, the electromagnet is energized to operate the shutter closing mechanism. If, in this type of shutter, the battery is defective, the electromagnet will not actuate the shutter closing mechanism after the measured time has elapsed. Thus, the shutter remains open.

An object of the present invention is to improve electrically controlled shutters.

Another object of the invention is to free electrically controlled shutters from the beforementioned disadvantages.

Another object of the invention is to operate the electrically controlled shutter automatically even if the battery of the electrically controlled shutter is defective or non-existent.

SUMMARY OF THE INVENTION

According to a feature of the invention these objects are attained in whole or in part, by furnishing the electrically controlled shutter with a standby mechanical timer that responds to the failure of the power source to actuate the electromagnet, and operates the shutter for a fixed period.

These and other features of the invention are pointed out in the claims forming a part of this specification. Other objects and advantages of the invention will become known from the following detailed description when read in light of the accompanying drawings.

DESCRIPTION OF PREFERRED EMBODIMENTS

Figure 1:
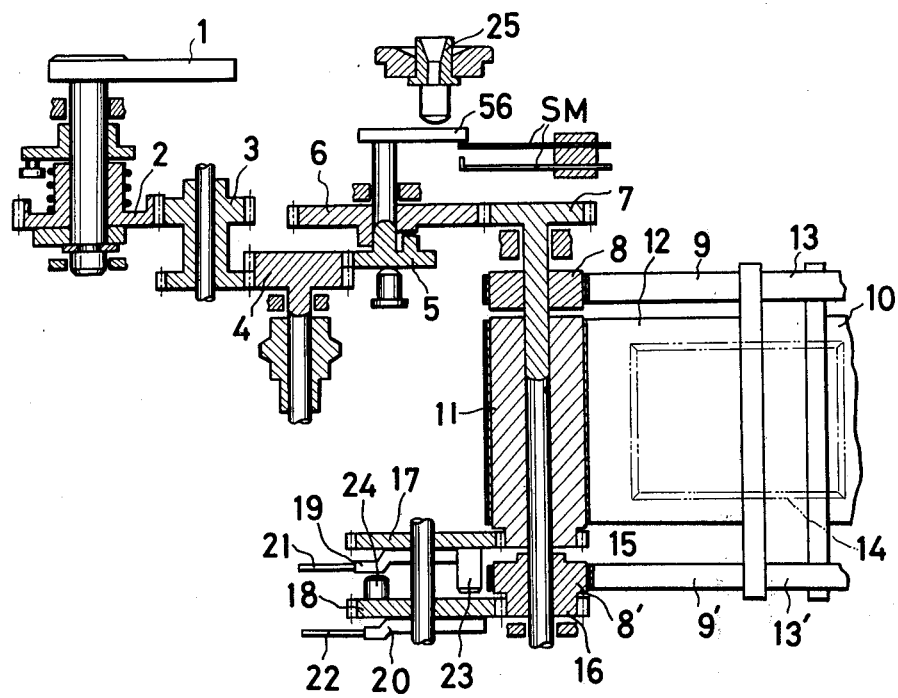
FIG. 1 is a cross-sectional view of a focal plane shutter to which the electrical shutter control embodying features of the present invention are applied.

The shutter of FIG. 1 is a conventional focal plane shutter. Here a film windup lever 1 winds up the film through a mechanism, not shown. At the same time, the lever 1 rotates a drive chain composed of gears 2, 3, 4, 5, 6, and 7 so as ultimately to rotate two coupled front screen drums 8 and 8'. Two bands 9 and 9', secured to the drums 8 and 8' draw a front screen 10. A drum 11 draws a rear screen 12 which is held taut by bands 13 and 13'. A frame 14 of the film is shown in dot dash lines. A gear 15 at the end of the rear drum 11 and a gear 16 at the end of the front drum 8' respectively engage spur gears 17 and 18. A rear screen pawl disc 19 fixed to the side of the spur gear 17 rotates therewith. A front screen pawl disc 20 is fixed to the side of the spur gear 18 to rotate therewith.

Rotation of the windup lever 1 rotates the front screen drums 8 and 8' through the gears 2, 3, 4, 5, 6, and 7. The gear 16 thus turns the gear 18. A pin 24 mounted on the gear 18 catches a pin 23 projecting from the gear 17 as the gear 18 rotates during the shutter cocking action of the windup lever 1. The engagement of the pins 24 and 23 during rotation of the gear 18 rotates the gear 17 so that the drum 11 winds up the screen 12 while the drums 8 and 8' wind up the screen 10. After the screens are wound up, a rear screen locking pawl 21 engages a lip in the disc 19 so as to prevent return rotation of the disc 19, the gear 17, and the drum 11, and hence prevent resilient means, not shown, from drawing the screen 12 from its cocked position. Thus, the pawl 21 holds the screen and the members 11, 17 and 19 in a cocked state. Similarly, a front screen locking pawl holds the disc 20, the gear 18, and the gear 16 and the drums 8 and 8' as well as the screen 10 in a cocked position against the force of resilient means, not shown.

The locking pawl 22 is arranged to release the disc 20 and allow the resilient means which may be in the form of a take-up drum to draw the front screen across the place of the film unrestrained by the now released gears 18 and 16 and the drums 8 and 8'. Thereafter, the pawl 21 can release the disc 19 and allow free rotation of the gears 17 and 15 as well as the drum 11. This permits the resilient means to draw the rear screen across the plane of the film and close the shutter. The front screen opens the shutter and the rear screen closes the shutter.

In operation the windup lever 1 rotates the gears 2, 3, 4, 5, 6, and 7 as well as the front screen drums 8 and 8'. Thus, the front screen 10 and the bands 9 and 9' are wound up around the front screen drum. At the same time, the gear 18 rotates the gear 17 through the pins 23 and 24. Thus, the rear screen drum is rotated to wind up the rear screen 12 through the bands 13 and 13'.

Figure 2:
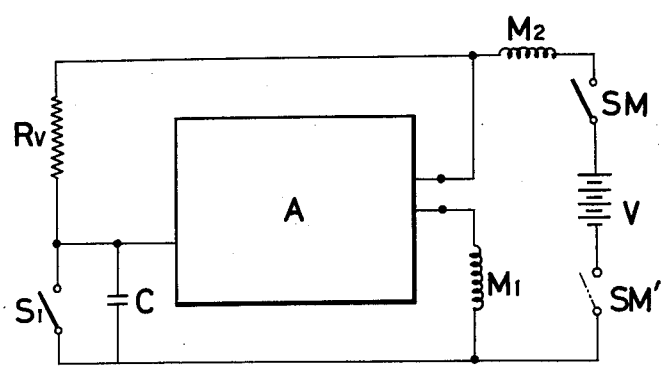
FIG. 2 is a schematic block and circuit diagram of the electrical controls embodying features of the invention for operating the shutter in FIG. 1.

In a conventional electrically controlled shutter pushing down of a shutter release button 25 would close a switch $S_M$ that would energize a circuit such as shown in FIG. 2. It would also disengage the gear 5 from the gear 6 so that the gears 6 and 7 could rotate freely relative to the gear 5. When the shutter button 25 is pushed down further in a conventional system it would cause the pawl 22 to release the disc 20 and allow the front shutter to run. Running of the front shutter would then open a switch such as $S_1$. As a result, a capacitor C would charge through a resistor $R_V$ and when the capacitor C reached a predetermined charge a circuit A would respond by actuating an electromagnet which would cause the pawl 21 to release the disc 19 and the rear screen 21. Running of the rear screen would then end the exposure that was started by running of the front screen at an earlier time. Both screens would be pulled by the resilient means which may be in the form of a take-up drum. A switch $S_M'$ remains normally closed.

As can be seen, in conventional devices if the electromagnet which caused the pawl 21 to release the rear screen 10 were not energized by a sufficiently strong battery or no battery were inserted into the camera, the film would remain exposed after operation of the front screen.

This problem is avoided by the specific circuit illustrated in FIG. 2 and the arrangements in FIGS. 3a, 3b, 3c, and 3d. The circuit and these arrangements cooperate with the focal plane shutter shown in FIG. 1.

According to this embodiment of the invention, when the shutter button 25 presses down on a member 56 to close the switch $S_M$, an electromagnet $M_2$ is energized as shown in FIG. 2. This draws an armature 30 on a lever 29 toward the magnet $M_2$. The next few steps of the operation correspond to that of a conventional electrically controlled shutter. That is, the shutter button 25 decouples the gears 5 and 6 so that the gears 6 and 7 are freely rotatable relative to the gear 5.

As the shutter button 25 is pushed down further, coupling means, not shown, between the shutter button 25 in the pawl 22 cause the pawl 22 to release the disc 20 from its cocked or locked state. This allows the front drums 8 and 8' to rotate in response to the action of the resilient means in drawing the front screen 10 across the film.

Figure 3A:
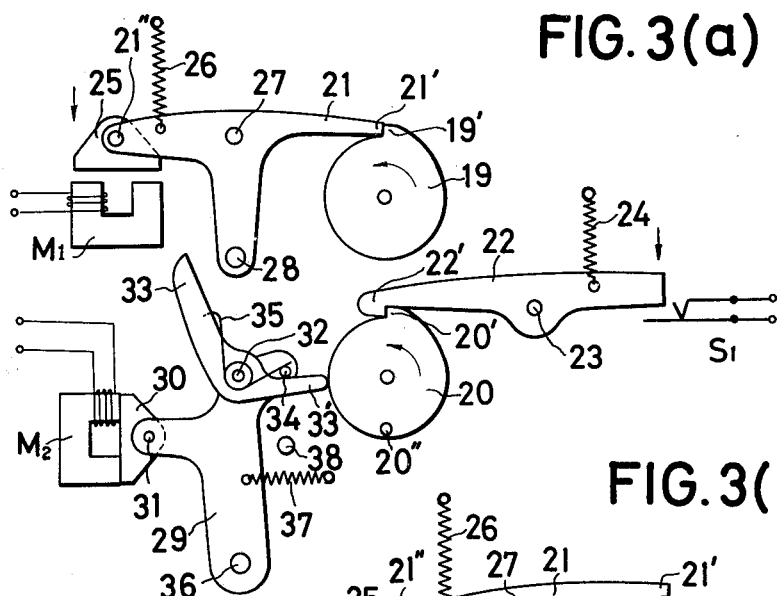
FIG. 3a is a somewhat schematized view of the electrical and mechanical arrangement responding to the circuit of FIG. 2 for controlling the shutter of FIG. 1; which arrangement embodies features of the invention; and wherein an electromagnet, when energized, activates a shutter closing mechanism.
Figure 3B:
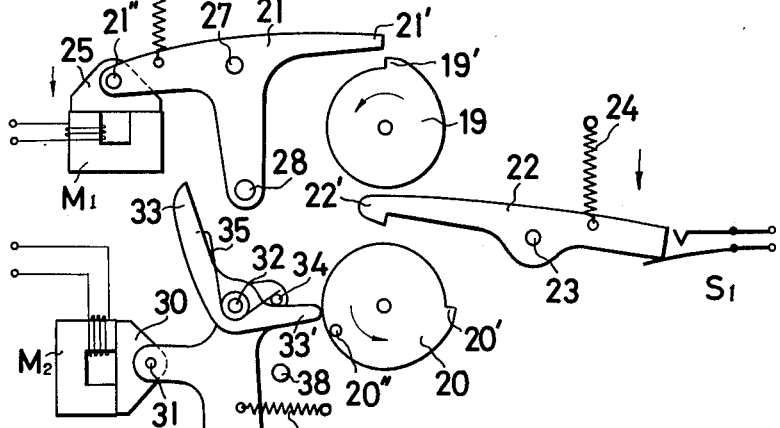
FIG. 3b shows the same arrangement as FIG. 3a when the shutter is released.

As shown in FIG. 3a, the pawl 22 releases the disc 20 when a catch 22' is moved against the force of a spring 24 about a pivot 23. As the left side of the pawl 22 lifts up to release the disc 20 the right end opens a switch $S_1$, as shown in FIG. 3b. The initial cocked position of the pawl 22 appears in FIG. 3a. Opening of the switch $S_1$ allows the capacitor C to charge through the resistor $R_V$. When the capacitor C reaches a predetermined state of charge the circuit A, which may be in the form of a Schmitt trigger, energizes the electromagnet $M_1$.

This draws an armature 30' from the position shown in FIG. 3a to the position shown in FIG. 3b. It pivots the pawl 21 about an axle 27 so that its right end 21' releases the lip 19' of the disc 19 and allows the disc 19 to rotate. This releases the rear screen 12.

According to this embodiment of the invention, the lever 29 is connected at a pin 31 to the armature 30 which is attracted by the electromagnet $M_2$. A lever 33 is pivotally mounted on the lever 29 at a pin 32 and biased by a spring 35 against a pin 34. A spring 37 draws the lever 29 against a stop 38 about a pivot 36 when the electromagnet $M_2$ fails to attract the armature 30. A pin 20" projects axially from the disc 20.

When the lever 29 is not attracted to the electromagnet, the pin 20" rotating with the disc 20 strikes one end 33' of the lever 33 to turn the lever 33 clockwise against the force of the spring 35. A pin 28 mounted on the rear screen locking pawl 21 is struck by the lever 33 as it rotates. This causes the pawl 21 to turn clockwise about its pivot 27 and free the disc 19 as well as the rear drum 11 and the rear screen 12.

When a battery V is provided and is operating properly, it energizes the electromagnet $M_2$ as soon as a switch $S_M$ is turned on. This attracts the lever 29 and allows the lever 33 to remain outside the operating range of the pin 20" on the disc 20 and avoid hitting the rear screen locking pawl 21. Thus, as long as the battery V operates properly the shutter performs in the usual manner without operation of the lever 33.

When the user forgets to insert the battery V or when the battery V is exhausted so that its voltage is less than a predetermined value, closing of the switch $S_M$ fails to cause the electromagnet $M_2$ to attract the lever 29. The spring 37 then holds the lever 29 against the stopping pin 38 as shown in FIGS. 3c and 3d.

Figure 3C:
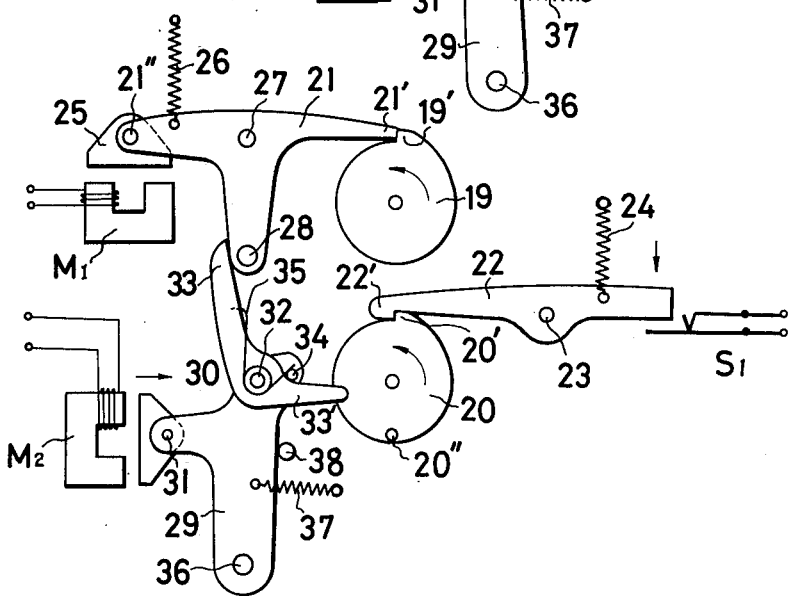
FIG. 3c illustrates the same arrangement as shown in FIG. 3a when the power source is inoperative and when the shutter is cocked.
Figure 3D:
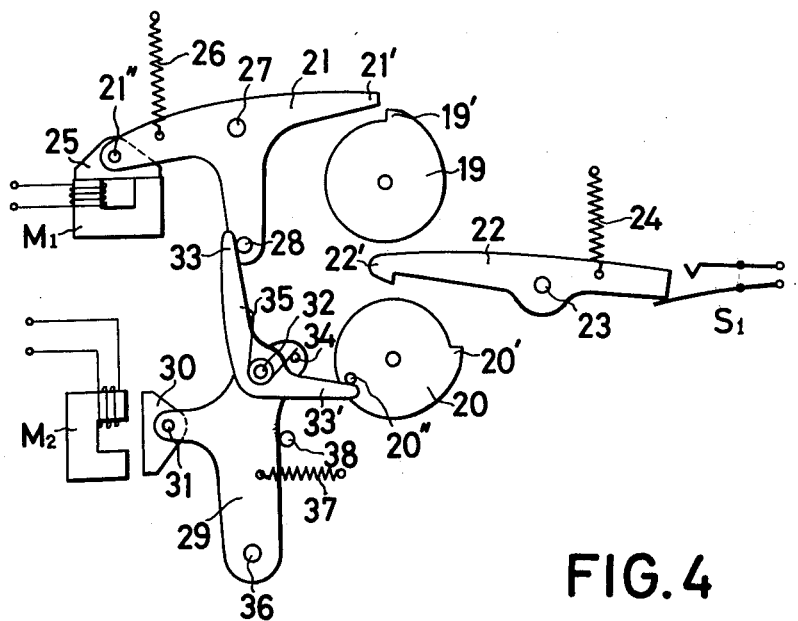
FIG. 3d illustrates the same arrangement as shown in FIG. 3c after the shutter is released.

Here FIG. 3c illustrates the condition of the levers when the shutter has just been cocked and the drums 8, 8', and 11 wound. FIG. 3d illustrates the condition after the disc 20 has been released by the pawl 22. In the position shown in FIG. 3c, when the front screen 10 starts moving as the pawl disc 20 is rotated, its pin 20" ultimately strikes one end 33' of the lever 33. This occurs after an elapse of a predetermined period of time. This rotates the lever 33 in the clockwise direction against the force of the spring 35 as shown in FIG. 3d. The lever 33 then strikes the pin 28 and rotates the rear screen locking pawl 21 about the axle 27 against the force of the spring 26 in the same direction as it would have turned in response to attraction by the electromagnet $M_1$. This releases the rear screen pawl disc 19 which operates the rear screen 12 and which permits the rear screen 12 to be drawn across the film so as to close the shutter. The shutter had been opened by operation of the front screen. In this way, the film is exposed for a period of time determined by the rotation of the pin 20" from the position shown in FIG. 3c to that state shown in FIG. 3d.

Figure 4:
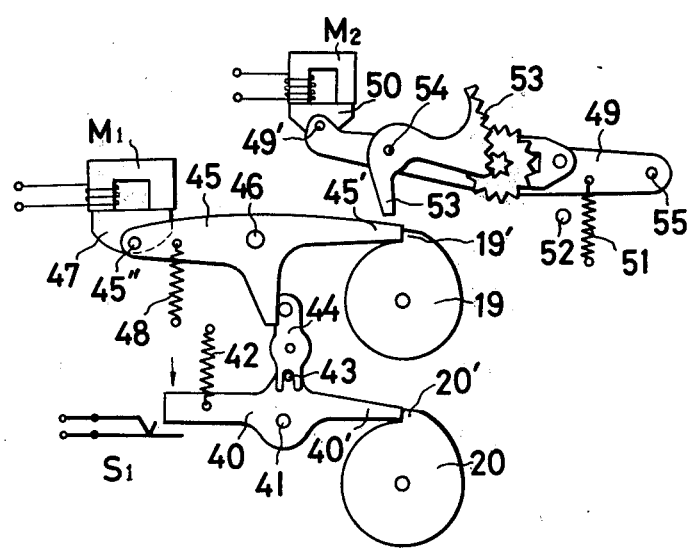
FIG. 4 illustrates another arrangement similar to the one in FIG. 3a and embodying features of the invention; wherein the shutter is wound, and wherein the rear screen is closed by cutting off current to the electromagnet.

The apparatus described with respect to FIGS. 1, 2, 3a, 3b, 3c, and 3d concerns an embodiment of the present invention in the type of shutter that releases the shutter closing screen by energizing an electromagnet $M_1$. Thus, the disc 19 is released from its blocked state by attracting the rear screen locking pawl with the electromagnet $M_1$. FIG. 4 illustrates an arrangement, which when used with the shutter of FIGS. 1 and 2 represents an embodiment of the invention applied to the other type of shutter. In this arrangement, after the shutter has been opened and a predetermined time has elapsed, the shutter closing screen is operated by deenergizing an electromagnet. In this case, the disc 19 is released from its blocked state by deenergizing the electromagnet $M_1$ and disengaging the rear screen locking pawl.

When the arrangement of FIG. 4 is used, and the shutter release button 25 is pushed down to its first position it closes the electric power switch $S_M$. Electric current is then allowed to flow to both of the electromagnets $M_1$ and $M_2$. Here an escapement or governor 53 is mounted on a lever 49. When the electromagnet $M_2$ does not exert a sufficient attractive force, a spring 51 causes the governor 53 to block the rear screen disc 19. After a predetermined delay time established by the governor 53 this blocking action is discontinued.

Using the arrangement of FIG. 4, when the shutter button 25 is pressed to close the main switch $S_M$, electric current flows in the electromagnet $M_1$. This causes the lever 45 to block the rear screen even when the front screen has been started. Then after a predetermined period of time established by the capacitor C and the resistor $R_V$, the electric current to the electromagnet $M_1$ is cut off. This allows a spring 48 to move the lever 45 in a counterclockwise direction and release the disc 19 so that the rear screen can move along the focal plane and close the shutter. However, if the battery V has not been placed in the camera, or if it is defective, the locking pawl 45 is moved out of the path of the disc 19. Ordinarily, in conventional devices, the disc 19 would be permitted to rotate and both screens would run simultaneously. Thus, the film would not be exposed.

However, according to this embodiment of the invention, a spring 51 rotates the lever 49 counterclockwise about the pin 55 and forces the pawl 53 to push the end 45' of the pawl 45 into engagement with the lip 19' of the disc 19. When the battery V has a voltage sufficiently high, the electromagnet $M_2$ attracts the lever 49 through the armature 50 at the time of shutter release. This disengages the pawl 53' from the end 19' of the lever 45. Thus, the shutter functions in the usual manner.

However, when the battery V has not been placed in the camera or when it exhibits a voltage less than a predetermined value, the sector 53 blocks the rear screen pawl disc 19 until the governor allows the lip 19' of the disc 19 to push the sector 53 out of its path. This is determined by the governor's anchor and its anchor gear.

Figure 5:
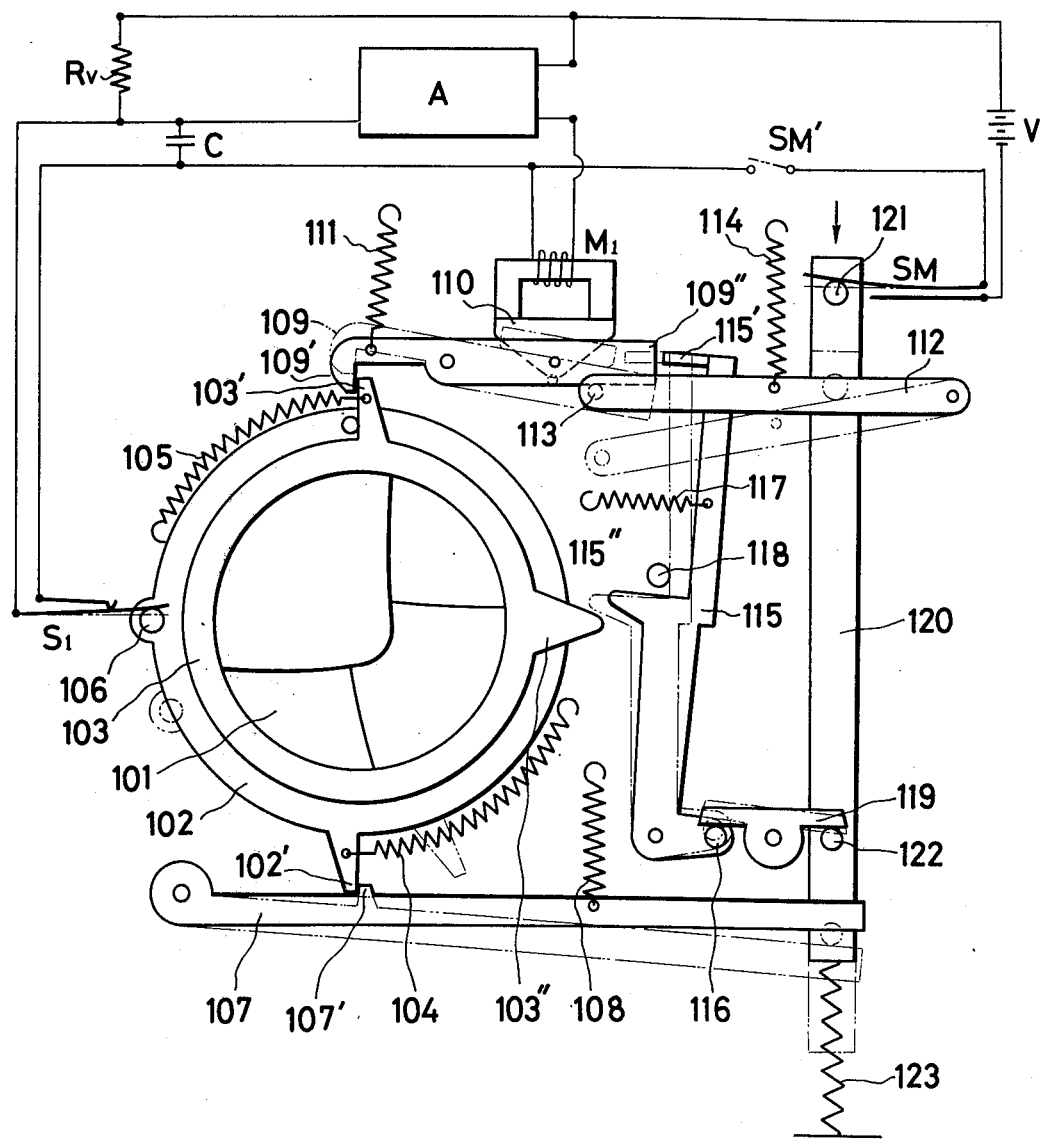
FIG. 5 illustrates another electrically controlled shutter embodying features of the present invention.

The embodiment of FIG. 5 illustrates the manner in which the invention is used with a between-the-lens shutter. Here a shutter blade 101 is opened by a release ring 102 and closed by a closing ring 103. Springs 104 and 105 draw the opening rings 102 and 103 at radial projections 102' and 103' from their initial positions shown in FIG. 5 in counterclockwise directions. Counterclockwise movement of the ring 102 opens the blade and counterclockwise movement of the ring 103 thereafter closes the blade.

A pin 106 on the shutter release ring closes a switch $S_1$ to short circuit a capacitor C. A release lever 107, pivoted about its left end, is drawn upwardly by a spring 108 so that a catch 107' engages the projection 102' to hold the release ring 102 in its initial position. A lever 109 holds the ring 103 in its initial position by means of a catch 109' that engages the projection 103' and prevents the ring from being pulled by the spring 105. An electromagnet $M_1$, when energized, draws an armature 110 upwardly against the lesser clockwise torque of a spring 111. Even when the electromagnet is unenergized, before the shutter button is pressed, a spring 114 draws a lever 112 upwardly with sufficient force so that a pin 113 pushes the armature 110 up against the force of the spring 111.

A governor lever 115 carrying projections 115' and 116 is biased by a spring 117 in the counterclockwise direction. A cam projection 115" near the center of the lever 115 is engageable with a cam projection 103" on the closing ring 103. The spring 117 is comparatively weak. A pin 118 catches the lever 117 when it has been pivoted in the counterclockwise direction.

When the shutter has been cocked, and before the shutter button is pressed, a spring 123 pushes a release bar 120 upwardly. A pin 122 rotates the lever 119 so that the pin 116 goes down. The lever 115 is thus pushed clockwise. The spring 114 draws lever 112 so that the armature 110 rests on the electromagnet M.

A pin 121 holds a switch $S_M$ open. The latter connects a power source or battery V in a circuit that includes the electromagnet $M_1$, the resistor $R_V$ which forms a time constant circuit with the capacitor C, a switching circuit A, and a normally closed switch $S_M'$.

In operation, when a shutter button pushes down the release bar 120 the pin 121 allows the main switch $S_M$ to close. This allows the source V to energize the armature $M_1$. The armature $M_1$ now holds the lever 109 in position against the force of spring 111. As the release bar moves down further the pin 121 presses the lever 112 down. This would free the armature 110 were it not for the electromagnet $M_1$.

As the release bar 120 is pushed down even further the pin 122 turns the lever 107 against the force of the spring 108 and the catch 107' releases the projection 102'. This allows ring 102 to rotate and open the shutter blades 101. As the ring 102 starts rotating the pin 106 allows the switch $S_1$ to open and permits capacitor C to start charging through the resistor $R_V$.

After an elapse of time determined by the time constant of the resistor $R_V$ and the capacitor C the magnet $M_1$ is de-energized. The spring 111 now draws the catch 109' on the lever 109 out of the path of the projection 103' so that the spring 105 can draw the closing ring 103 in the counterclockwise direction so as to close the blades 101. Release of the ring 102 opened the blades 101 and started the exposure. Release of the closing ring 103 closes the blades 101 and thereby terminates the exposure.

When the electronic timer does not function properly, such as when there is no source V of electricity, or when the voltage of the battery V is lower than a prescribed value, closing the main switch by pressing the release bar 120 will not energize the magnet $M_1$. At the same time, when the lever 112 moves, the lever 109 is rotated in a clockwise direction by the spring 111. This disengages the catch 109' from the projection 103'. The end 115' of the governor lever 115 which has been held in its position by the end 109" of the lever 109 then disengages from the end 109″. It shifts to the left until it contacts the positioning pin 118 that serves as a stopper.

Thus, when the catch 107′ of the release lever 107 and the projection 102′ of the ring 102 are disengaged, the blade release ring 102 and the blade closing ring 103 start moving at the same time. However, as the blade closing ring is rotated its cam 103″ strikes the projection 115″ of the lever 115. This restrains rotation of the ring 103. Thus, the cam 103″ is hindered until the force of the spring 105 pushing the cam 103″ can displace the lever 115 to the right against the force of the spring 117. This delays the blade closing ring 103 long enough to achieve an exposure for a predetermined length of time. When the release bar 120 resumes its original position, each lever is returned to its original position.

The shapes and dimensions of the lever 115 and the spring 117 may be established to produce the most frequently used shutter time.

The electromagnet $M_1$ stops attracting the armature 110 whenever it is not sufficiently excited such as when the voltage of the source V becomes lower than a predetermined limit or, when the circuit is otherwise inoperative. This automatically allows operation of the shutter by a standby mechanical timer. At the same time, when an electronic timer is used, the magnet is excited just when the shutter is released.

In the disclosed electrically controlled shutters even when the voltage of the source V falls below the prescribed limit, it is still possible to control the shutter. Other embodiments of the invention employ suitable means using semiconductors such as transistors for providing the attracting power of the electromagnet $M_1$. The power varies stepwise in response to the variation in voltage.

According to an embodiment of the invention, a flash photograph switch is provided near the source V in the control circuit. This serves to cut off the source of electricity and permit attachment of a flash lamp or switchover of a setting ring or both, thereby permitting switchover of the shutter timer for flash photography.

An auxiliary changeover switch $S_M'$ is provided as shown in FIGS. 2 and 5. This is normally closed.

The film and shutter windup mechanism in FIG. 1 is, according to an embodiment of the invention, modified so that a windup lever rotates the gear 5 through the gears 2 and 3 and the gear 5 winds up both the gear 4 and the gear 6 with the same additional clearance between the gear 5 and the gears 4 and 6. In such a modification, the main switch $S_M$ may be actuated by the winding mechanism by using the lever 56 as a switchover lever and providing a clearance between the winding mechanism and the lever 56. In this way an idling angle is produced for the winding lever. Thus, switchover is effected even if the electrical shutter is not active.

While embodiments of the invention have been described in detail, it will be obvious to those skilled in the art that the invention may be embodied otherwise without departing from its spirit and scope.

What is claimed is:

1. An exposure control system for a camera, comprising a shutter, shutter operating means for opening and closing the shutter so as to hold the shutter open and then close it, electric shutter control means associated with said operating means for controlling the time during which said operating means holds open said shutter, said electric shutter control means assuming an effective state when electrically energized beyond a predetermined electrical value and an ineffective state in which it is not energized beyond the electrical value; mechanical control means movable into a first position in which said mechanical control means is engageable with said operating means for controlling the time during which said operating means holds open said shutter and retractable from the first position to a second position in which said mechanical control means remains out of engagement with said operating means; and first means forming a part of said electric shutter control means for assuming one condition when said electric control means is energized into the effective state and another condition when said electric shutter control means is in the ineffective state, and turn-over means associated with said first means for automatically allowing said mechanical control means to retract to the second position when said first means is in the one condition and for automatically allowing said mechanical control means to move to the first position when said first means is in the other condition.

2. An exposure control system as in claim 1, wherein said shutter operating means includes shutter opening means and shutter closing means, said shutter closing means being responsive to said electric shutter control means when said electric shutter control means is energized so as to be in its effective state and being responsive to said mechanical shutter control means when said electric shutter control means is not energized so as to be in the state for defining a predetermined shutter opening duration for obtaining a given exposure.

3. An exposure control system as in claim 1, wherein said mechanical shutter control means includes a mechanical timer for constraining said shutter operating means to keep the shutter open for a predetermined time.

4. A system as in claim 1, wherein said electric shutter control means includes a timing circuit for defining a duration between the time said shutter operating means opens and closes the shutter and a power source for applying an electric driving power to the timing circuit, said auxiliary means being coupled to said power source for detecting the state of said electric shutter control means.

5. A system as in claim 1, wherein said auxiliary means includes detecting means for detecting the state of said electric shutter control means, said detecting means including an electromagnet connected in an electrical path from the power source to said timing circuit and being energized on the basis of the electrical condition of said power source.

6. An exposure control system for a camera, comprising a shutter, shutter operating means for opening and closing the shutter so as to hold the shutter open and then close it; electric shutter control means coupled to said operating means for controlling, when energized beyond a given electrical value, the time during which said operating means hold open said shutter; said electric shutter control means having battery terminals, said electric shutter control means being energized in response to said terminals being electrically energized beyond a given electrical value; mechanical control means movable into a first position in which said mechanical control means is engageable with said operating means for controlling the time during which said operating means holds open said shutter and retractable to a second position in which the mechanical control means cannot engage said operating means; auxiliary means in said electrical control means and coupled to the terminals for producing one condition when the terminals are energized beyond the given value and another condition when the battery terminals are not energized beyond the given value, and switch-over means associated with said auxiliary means for automatically allowing said mechanical control means to retract to the second position when the auxiliary means is in the one condition and for automatically allowing said mechanical control means to move to the first position when the auxiliary means is in the other condition.

7. An exposure control system as in claim 6, wherein said mechanical shutter includes a mechanical timer, said mechanical timer including a member which moves at a constant speed after said shutter operating means opens said shutter, and wherein said mechanical timer further includes a second member responsive to said first member for constraining said operating means to close said shutter after said first member has executed a predetermined movement at the constant speed.

8. An exposure control system as in claim 6, wherein said shutter operating means includes shutter opening means and shutter closing means, and said electric shutter control means includes a magnet which actuates said shutter closing means when the electric shutter control means is energized into its effective state by the battery terminals.

9. An exposure control system as in claim 6, wherein said auxiliary means includes electrical means coupled to the battery terminals and responsive to the battery terminals being ineffectively and operatively energized for moving and retracting said mechanical control means.

10. An exposure control system as in claim 9, wherein said auxiliary means includes an electromagnetic element responsive to energization of said terminals for moving and retracting said mechanical control means.

11. An exposure control system as in claim 10, wherein said shutter operating means includes shutter opening means and shutter closing means, said magnet fails to actuate said shutter closing means when said electric shutter control means is disabled, said auxiliary means including a responder means responsive to said magnet failing to actuate said shutter closing means for enabling said mechanical shutter control means when said electric shutter control means is disabled.

12. An exposure control system as in claim 6, wherein said auxiliary means includes a magnet which enables said mechanical shutter control means in response to the electric shutter control means being unenergized at the battery terminals, and wherein said electric shutter control means includes a magnet which closes said shutter when said electric shutter control means is effectively energized.

13. An exposure control system for a camera, comprising a shutter, shutter operating means for opening and closing the shutter so as to hold the shutter open and then close it, electric shutter control means coupled to said operating means for controlling the time during which said operating means holds open said shutter, said electric shutter control means including a voltage power source capable of operating above and below a given value and timing circuit means responsive to the voltage of said power souce for accurately defining the time during which the operating means holds open the shutter when the power source exhibits a voltage above the given value so as to define the time during which the operating means holds open the shutter; mechanical control means coupled to said operating means for controlling the time during which said operating means holds open said shutter; and auxiliary means in said electric control means having an electromagnet coupled to the power source so as to be excited by the power source when the voltage of power source exceeds the given value, said auxiliary means including turn-over means responsive to said magnet for coupling said mechanical control means to said shutter operating means when the magnet is unexcited, and for maintaining the mechanical control retracted out of engagement with said operating means when said magnet is excited.

14. An exposure control system for a camera, comprising a shutter, shutter opening means for opening the shutter, shutter closing means for closing the shutter, electric shutter control means responsive to actuation of said shutter opening means and coupled to said shutter closing means so as to delay the closing means and then actuate said shutter closing means, a power source, said control means having timing means energized by said power source for defining a duration of time that the control means delays operation of said shutter closing means, said power source imparting to said timing means and said shutter control means an effective state in which said timing means and said shutter control means actuate said shutter closing means accurately after the duration of time when the power supply exhibits a voltage greater than a given voltage and imparting to said shutter control means and said timing means an ineffective state in which said shutter control means fails to operate said shutter closing means after the defined duration when the voltage of the power source is less than the given value, auxiliary means in said shutter control means for producing one or another output whether said timing means and said control means is effective or ineffective, mechanical shutter control means coupleable to closing means for preventing said shutter closing means from closing the shutter for a predetermined interval and then actuating said shutter closing means to close the shutter when said mechanical shutter control means is coupled to said shutter closing means, and switch-over means in said shutter control means and associated with said auxiliary means and coupled to both of said mechanical shutter control means and responsive to said electric shutter control means being in its effective state for keeping said mechanical shutter control means decoupled and disengaged from said shutter closing means and being responsive to said electric shutter control means being in its ineffective state for coupling said mechanical shutter control means to said shutter closing means.

15. An exposure control system as in claim 14, wherein said auxiliary means includes a first electromagnet coupled to said shutter closing means for initiating operation of said shutter closing means.

16. A system as in claim 14, wherein said shutter closing means has a first shutter closing member associated with the electromagnet for initiating operation of said shutter closing means and second shutter closing member selectively engageable with the shutter, and wherein said auxiliary means has a second electromagnet unexcited by the power source when it has the voltage below the given value, which is associated with the second shutter closing member so as to move the second closing member into an effective position for closing the shutter independently of the electric control means.

17. An exposure control system as in claim 14, wherein said mechanical control means includes a mechanical governor.

18. An exposure control system for a camera, comprising a shutter, shutter opening means for opening the shutter, shutter closing means for closing the shutter, electric shutter control means responsive to actuation of said shutter opening means and coupled to said shutter closing means so as to delay the closing means and then actuate said shutter closing means, a power source, said control means having timing means energized by said power source for defining a duration of time that the control means delays operation of said shutter closing means, said power source imparting to said timing means and said shutter control means an effective state in which said timing means and said shutter control means actuate said shutter closing means accurately after the duration of time when the power supply exhibits a voltage greater than a given voltage and imparting to said shutter control means and said timing means an ineffective state in which said shutter control means fails to operate said shutter closing means after the defined duration when the voltage of the power source is less than the given value, means for detecting the voltage to detect the state whether said timing means and said control means is effective or ineffective, mechanical shutter control means coupleable to said closing means for preventing said shutter closing means from closing the shutter for a predetermined interval and then actuating said shutter closing means to close the shutter when said mechanical shutter control means is coupled to said shutter closing means, and switch-over means associated with said detecting means and coupled to both of said mechanical shutter control means and responsive to said electric shutter control means being in its effective state for decoupling said mechanical shutter control means from said shutter closing means and being responsive to said electric shutter control means being in its ineffective state for coupling said mechanical shutter control means to said shutter closing means.

19. An exposure control system for a camera, comprising a shutter, shutter opening means for opening the shutter and shutter closing means for closing the shutter, electric shutter control means responsive to actuation of said shutter opening means and coupled to said shutter closing means so as to delay the closing means and then actuate said shutter closing means, said electric shutter control means assuming an effective state when electrically energized beyond a predetermined electrical value and an ineffective state in which it is not energized beyond the electrical value; mechanical control means movable into a first position in which said mechanical control means is engageable with said shutter opening means for preventing said shutter closing means from closing the shutter for a predetermined interval and retractable from the first position to a second position in which the mechanical control means remains out of engagement with said shutter opening means; at the first position, the mechanical control means being actuated by the opening action of the shutter opening means, and the shutter closing means being actuated in association with the action of the mechanical control means after a predetermined interval; said electric control means including a portion thereof for assuming one condition when said shutter control means is energized into the effective state and another condition when said shutter control means is in the ineffective state; and turn-over means cooperating with said portion of said electric control means for allowing said mechanical control means to retract to the second position when the portion is in the one condition and for allowing said mechanical control means to move to the first position when said portion of said electric control means is in the other condition.

20. The exposure control system of claim 19 wherein said electric shutter control means includes only one electromagnetic element which operates to control shutter time and also for assuming the one condition when said shutter control means is energized into the effective state and another condition when said shutter control means is in the ineffective state.

* * * * *

UNITED STATES PATENT OFFICE
CERTIFICATE OF CORRECTION

Patent No. 4,123,766            Dated October 31, 1978

Inventor(s) GORO HASEGAWA

It is certified that error appears in the above-identified patent and that said Letters Patent are hereby corrected as shown below:

Claim 18, column 11, line 34, delete "and";

line 35, delete "both of".

Signed and Sealed this

*Twenty-sixth* Day of *February 1980*

[SEAL]

*Attest:*

SIDNEY A. DIAMOND

*Attesting Officer*      *Commissioner of Patents and Trademarks*